May 31, 1960 M. B. BOSWORTH ET AL 2,938,692
CABLE CLAMP SUPPORT

Filed Aug. 22, 1956 2 Sheets-Sheet 1

INVENTORS
MELVIN B. BOSWORTH
WARREN E. GRAY
DONALD S. WILKINSON
By George C. Sullivan
Agent

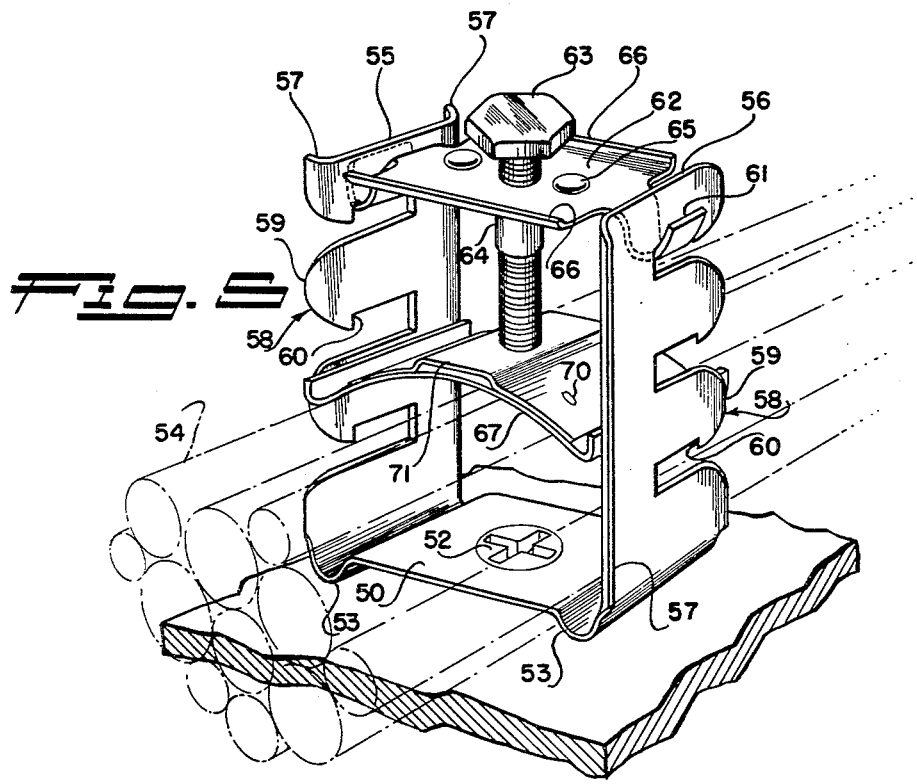

United States Patent Office 2,938,692
Patented May 31, 1960

2,938,692
CABLE CLAMP SUPPORT

Melvin B. Bosworth, Glendale, Warren E. Gray, Van Nuys, and Donald S. Wilkinson, Los Angeles, Calif., assignors to Lockheed Aircraft Corporation, Burbank, Calif.

Filed Aug. 22, 1956, Ser. No. 605,645

8 Claims. (Cl. 248—68)

This invention relates generally to clamps and more particularly to an adjustable device for securing and supporting wire bundles, cables, conduit and tubing, or the like.

In many different structures, but particularly in aircraft, it is necessary to provide support for large members of wire and plumbing lines so that the members and lines will be protected against damage and from interfering with surrounding equipments. The conventional supporting clamp which is used almost exclusively in the aircraft industry consists of an insulated strap and a screw or bolt which is inserted through openings in the ends of the strap for attachment to supporting structure. The strap, when wrapped around a plurality of wire or plumbing lines, hold the wire or lines effectively and firmly in place.

However, difficulties have been encountered when this conventional clamp is employed due to the inconvenience of determining the proper size range of the strap for a particular wire bundle or plumbing line. Also, because of the screw and bolt, it is sometimes difficult to permit close installation of wires and tubing runs. Because of these difficulties, numerous types of clamps have been devised in the past, but, for one reason or another, a suitable clamp has not qualified as a replacement for the conventional clamp.

Accordingly, the present invention provides a support member engageable with a wire bundle, for example, which substantially surrounds the bundle. The support member is constructed so that attachment may be made to a structural member prior to engagement and clamping of the wire bundle. An adjustment means in cooperation with a keeper bar and a clamp bar provides a positive clamping action with advantages of a self-locking feature. The adjustment means may be activated to grip about the bundle over a wide range of sizes without the necessity of removing parts or the clamp per se.

An object of the present invention is to provide a clamp which, because of its reliability and versatility may, in most all applications replace the conventional strap type wire and tubing clamp.

Another object of this invention is to provide a clamp which will permit attaching wire or plumbing lines to supporting structure without the use of various sizes or shapes of clamps. The clamp of the present invention provides a wide clamping range which is adjustable to the size of the bundle or tubing.

Another object is to provide a clamp which is universal in size over a limited range and which provides a positive clamping action having the advantage of self-locking.

Another object of this invention is to provide a clamp which will conveniently accommodate the spacing of wire bundles from sharp edges on the supporting structure.

Still another object of this invention is to provide a clamp which, by virtue of its construction details, will prevent improper installation thereof and which will not loosen when subjected to vibrations. Due to this feature, the clamp may be dependably employed where the supporting structure is hidden, such as behind an insulation blanket or where only one side of the supporting panel is accessible.

Another object is to provide a novel arrangement whereby the clamp will not disassemble or become weakened due to high G-forces which might be encountered. Conventional U-shaped clamps have been known to collapse so that keeper bars may inadvertently disengage.

Further and other objects will become apparent from a reading of the following description, especially when considered in combination with the accompanying drawing wherein:

Figure 5 is a perspective drawing of another embodiment of the present invention.

Figure 1:
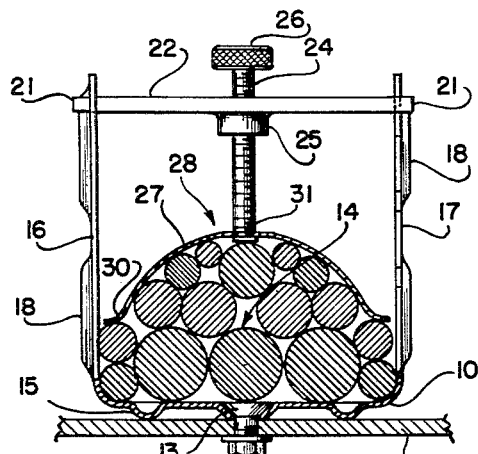
Figure 1 is a view showing a typical installation of the adjustable clamp of the present invention.
Figure 2:
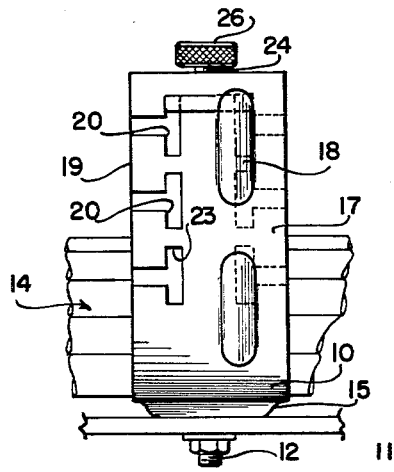
Figure 2 is a side elevational view of the clamp shown in Figure 1.
Figure 3:
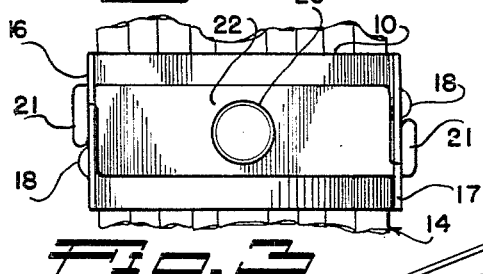
Figure 3 is a top view of the invention shown in Figure 1.

Referring to the figures, the clamp of the present invention includes a support member or staple 10 suitably secured to a structural member or a mounting strip 11 by a nut and screw arrangement 12. The portion of the staple adjacent the mounting strip is provided with a recess portion 13 into which the screw 12 is inserted. Construction in this manner eliminates snagging or damage to a wire bundle 14 supported by the clamp which might occur if the screw came in contact with the bundle. For reasons of stability and balance, stiffening beads 15 are provided in the staple equal in depth to the recess portion 13. The beads and recess portion are the only portions of the staple which engage the mounting strip.

Figure 4:
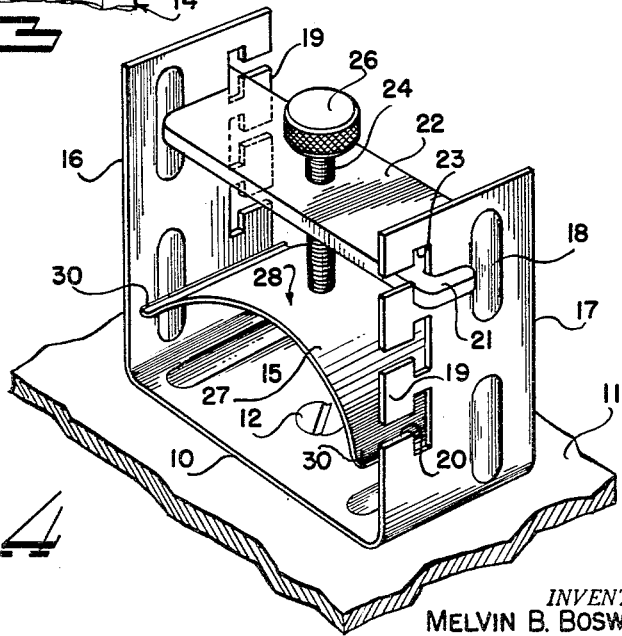
Figure 4 is a perspective drawing of the invention of Figure 1 showing more clearly the relationship between the keeper bar, clamp bar, and adjusting means.

Staple 10 further includes a pair of legs 16 and 17 extending in a generally parallel relationship giving the staple a U-shaped design. Although the staple may be of any desired cross section, the preferred embodiment is rectangular. Additional strength may be achieved by the employment of stiffening beads 18. As seen more clearly in Figure 4, a plurality of transverse teeth 19, formed by T-shaped notches 20, is provided on each leg of the staple which are equally spaced substantially throughout the length of each leg for receiving a notched end 21 on each end of a keeper bar 22 which slips into place longitudinally along the legs. The notches 20, associated with leg 16, are provided along the edge of leg 16 opening in the opposite direction of the notches 20 along the edge of leg 17. The shape of notches 20 and their placement on opposite sides of the clamp insure against disengagement of the keeper bar when the clamp is subjected to high G. force loads or stresses.

The notches 21 of the keeper bar 22 are disposed on opposite sides in order to mate with notches 20 provided on each leg. Normally, the notched ends of the keeper bar will engage parallel related notches 20 as counted from the top or end of each leg. Notches 21 of the keeper bar mate with notches 20 of the staple legs and permit the notched ends of the keeper bar to travel into engagement with each leg of the pair to fasten the keeper bar in place.

Whether the keeper bar rests in the upper portion 23 or lower portion of the T-shaped notch 20 depends sometimes upon the physical position of the staple or perhaps the size of the bundle being supported. It is customary to employ the position least susceptible to gravitational stresses. The particular notches engaged are a function of the wire bundle size and shape.

Clamping action is achieved by rotating an adjusting means comprising a screw 24 causing it to travel through a nut 25 secured to the keeper bar. The screw is provided with a knurled head 26 for ease of adjustment. Nut 25 may be of any suitable variety; however, in instances where the clamp will undergo substantial vibrations or strains, a stop nut having an elastic or nylon insert is recommended for locking purposes. Direct and positive engagement between the adjusting means and the wire bundle is accomplished with a clamp bar 27. Clamp bar 27 is made from a flexible composition such as plastic, rubber spring metal and is provided with an exaggerated bow 28 into which the periphery of the wire bundle 14 is snugly fit. To prevent the clamp bar from binding against the legs 16 and 17 or from damaging the wire bundle, clamp bar ends 30 are curled toward the center of the bar to provide a rounded end. The clamp bar is seated in an undercut portion 31 of screw 24 and attachment is achieved by spinning over the end of screw 24 to secure the clamp bar to the screw.

Where it is desired to provide an insulated clamp for use with electrical lines, the staple 10 may be formed of a dielectric material or it may be coated with such a material.

As described hereinabove, the clamp may be assembled after installation of the mounting strip 11 by simply pushing screw 12 through the recess portion 13 of the staple and the mounting strip followed by securing the ports with the nut associated with screw 12. If the mounting strip is flat, stiffening beads 15 and the bottom of the recess portion will meet with the surface of the mounting strip. Wire bundle 14 may be placed between legs 16 and 17 of the staple and preferably positioned and distributed adjacent the bottom portion of the U-shaped staple. Clamp bar 28 is placed into engagement with the wire bundle so that the contour of the bundle fits into the bow 28 provided by the shape of the clamp bar. Keeper bar 22 may be positioned so that notched ends 21 engage with leg notches 20 and are suitably seated therein. Rotation of knurled head 26 positions screw 24 through nut 25, applies holding pressure to the clamp bar and hence the wire bundle. The holding pressure is applied to the keeper bar which firmly maintains the notched ends seated in their respective leg notches.

In reference to Figure 5, another embodiment of the present invention is shown wherein a staple 50 is provided with a recessed portion (not shown) into which a screw 52 is inserted. This construction is similar to the embodiment shown in Figure 1 except that the staple is bent in such a manner that stiffening beads 53 are provided so that the head of screw 52 will remain flush with the surface of the staple and thereby prevent damaging of a bundle of cables 54.

Staple 50 includes a pair of legs 55 and 56 extending in a generally parallel relationship giving the staple a U-shaped design. Added strength is achieved by providing a pair of rails or flanges 57 on the vertical sides of the staple legs. A plurality of transverse teeth 58 is provided on each leg of the staple which are equally spaced substantially throughout the length of each leg. Each tooth is provided with a rounded portion 59 and a catch 60. The catch is designed to receive a hook end 61 of a keeper bar 62 which slips into place longitudinally along the legs. As in the embodiment shown in Figure 1, the catches associated with leg 55 are provided along the edge of leg 55 opening in the opposite direction of the catches along the edge of leg 56.

The achievement of a suitable clamping action is realized by rotating an adjustment means comprising a screw 63 passing through the center of the keeper bar and traveling through a nut 64 secured to the keeper bar by means of rivets 65. Nut 64 is provided with an insert (not shown) composed of material such as phenolic, nylon, rubber, etc. which serves as a locking feature for the screw when the screw is tightened. Keeper bar 62 is strengthened by means of a pair of parallel rails or flanges 66.

A clamp bar 67 is carried by the end of the bolt. The bolt is coupled to the clamping bar by means of a member spot welded at points 70 to the clamping bar. The end of the bolt is inserted through the center of the member and its end is spun over to loosely retain the bolt from being withdrawn. This arrangement also permits the bolt to rotate without rotating the clamping bar.

The construction of the keeper bar will provide a greater clamping action than allowable for the embodiment shown in Figure 1 since the hooks provided on each end of the keeper bar are equal in depth to the lock nut.

It should be understood that certain alterations, modifications and substitutions may be made to the present disclosure without departing from the spirit and scope of this invention as defined by the appended claims.

We claim:

1. A clamp for supporting a bundle comprising, a sheet metal staple for carrying the bundle, the staple having a pair of legs spaced apart in a generally parallel relationship, a plurality of outwardly facing notches formed on each leg throughout a substantial portion thereof, the notches associated with one leg of the pair opening on one side of the staple while the notches associated with the other leg open on the opposite side of the staple, a keeper bar slidably carried by the legs of the staple, a pair of notches formed in the keeper bar for engagement with selected notches of the aforesaid plurality of notches, a flexible clamp bar having curled edges movable between the pair of legs engageable with the bundle, and adjustment means carried by the keeper bar for applying bundle holding pressure by the clamp bar whereby the holding pressure acts against the bundle and the notches via the keeper and clamp bars.

2. A clamp for supporting a bundle comprising, a sheet metal staple for carrying the bundle, the staple having a pair of legs spaced apart in a generally parallel relationship, a plurality of outwardly facing notches formed on each leg opening on opposite sides of the clamp, a keeper bar slidably carried between the pair of legs, a pair of notches formed on opposite sides of the keeper bar for engagement with the plurality of notches formed in the pair of legs, a flexible clamp bar having curled edges movable between the pair of legs engageable with the bundle, and means connecting the keeper bar to the clamp bar for applying pressure to the bundle in conjunction with the notched engagement of the keeper bar with the staple legs.

3. A clamp for supporting a bundle comprising, a staple for carrying the bundle, the staple having a pair of legs spaced apart in a generally parallel relationship, a plurality of T-shaped notches formed on each leg opening outwardly on opposite sides of the legs, a keeper bar slidably carried between the pair of legs, the keeper bar having a notch formed on opposite sides thereof for engagement with the plurality of notches formed in the pair of legs, a flexible clamp bar movable between the pair of legs engageable with the bundle and expandable under pressure to prevent bundle passage between the ends of the clamp bar and the staple legs, and means connecting the keeper bar to the clamp bar for applying pressure to the bundle in conjunction with the notched engagement of the keeper bar with the legs.

4. A clamp for supporting a bundle comprising, a staple for carrying the bundle, the staple having a pair of legs spaced apart in a generally parallel relationship, a plurality of T-shaped notches formed on each leg opening outwardly on opposite sides of the legs, a keeper bar slidably carried by the legs of the staple, the keeper bar having a first and second notch disposed on opposite sides thereof for engagement with selected notches of the aforesaid plurality of notches, a curved flexible clamp bar movable between the pair of legs engageable with the bundle, and adjustment means carried by the keeper bar for applying bundle holding pressure by the clamp bar, the adjustment means connected to the clamp bar to permit the expansion of the clamp bar when holding pressure is applied to prevent the passage of the bundle or any portion thereof between the ends of the clamp bar and the staple legs.

5. A clamp for supporting a bundle comprising, a staple for carrying the bundle, the staple having a pair of legs spaced apart in a generally parallel relationship, each leg of the pair having integrally formed notches opening outwardly on one side of the clamp and expandable under pressure to prevent bundle passage between the ends of the clamp bar and the staple legs, a keeper bar having notched ends opening on opposite sides of the keeper bar, the notched ends of the keeper bar engageable with the notches of each of the pair of legs, a bow shaped flexible clamp bar engageable with the bundle and screw adjusting means connecting the keeper bar to the clamp bar for applying holding pressure to the bundle in conjunction with the notched engagement of the keeper bar with the staple legs.

6. A clamp for supporting a bundle comprising, a staple for carrying the bundle, the staple having a pair of legs spaced apart in a generally parallel relationship, each leg of the pair having integrally formed notches opening outwardly on one side of the staple opposite to the opening of the side of the other leg, a keeper bar having notched ends opening on opposite sides of the keeper bar, the notched ends of the keeper bar engageable with the notches of each of the pair of legs, a bow shaped flexible clamp bar engageable with the bundle and expandable under pressure to prevent bundle passage between the ends of the clamp bar and the staple legs, and a screw adjusting means connecting the keeper bar to the clamp bar for applying holding pressure to the bundle whereby the holding pressure acts against the bundle and the notches via the keeper and clamp bars.

7. A clamp for supporting a bundle comprising, a staple for carrying the bundle, the staple having a first and second leg spaced apart in a generally parallel relationship, a first plurality of teeth associated with the first leg, a second plurality of teeth associated with the second leg, the first and second plurality of teeth disposed on opposite sides of the legs, a keeper bar slidably carried by the first and second leg having notched ends on opposite sides for engaging the first and second plurality of teeth, a clamp bar engageable with the bundle between the first and second legs and expandable under pressure to prevent bundle passage between the ends of the clamp bar and the staple legs, and means connecting the keeper bar to the clamp bar for adjusting holding pressure on the bundle.

8. A clamp for supporting a bundle on a structural member comprising, a staple for carrying the bundle, the staple having a first and second leg spaced apart in a generally parallel relationship, a first plurality of teeth associated with the first leg, a second plurality of teeth associated with the second leg, the first and second plurality of teeth disposed on opposite sides of the legs and facing outwardly, a keeper bar slidably carried by the first and second leg having notched ends for engaging the first and second plurality of teeth, a clamp bar engageable with the bundle between the first and second legs and expandable under pressure to prevent bundle passage between the ends of the clamp bar and the staple legs, and means connecting the keeper bar to the clamp bar for adjusting holding pressure on the bundle, stiffening beads formed in the staple, attachment means cooperating with selected beads for mounting the staple to the structural member, and means cooperating with selected beads formed in the staple for preventing the attachment means from damaging the bundle.

References Cited in the file of this patent

UNITED STATES PATENTS

| 1,755,201 | Blackburn | Apr. 22, 1930 |
| 2,437,535 | Jenkins | Mar. 9, 1948 |
| 2,569,451 | Browne | Oct. 2, 1951 |

FOREIGN PATENTS

| 695,125 | Germany | Aug. 17, 1940 |